United States Patent

Woollenweber et al.

Patent Number: 6,079,211
Date of Patent: Jun. 27, 2000

[54] TWO-STAGE SUPERCHARGING SYSTEMS FOR INTERNAL COMBUSTION ENGINES

[75] Inventors: William E. Woollenweber, Carlsbad; Edward M. Halimi, Montecito, both of Calif.

[73] Assignee: Turbodyne Systems, Inc.

[21] Appl. No.: 08/911,529

[22] Filed: Aug. 14, 1997

[51] Int. Cl.$^7$ .................................................. F02B 37/04
[52] U.S. Cl. ............................ 60/612; 60/602; 60/608
[58] Field of Search ........................... 60/600, 602, 607, 60/608, 611, 612

[56] References Cited

U.S. PATENT DOCUMENTS

| | | |
|---|---|---|
| 2,078,499 | 4/1937 | Ljungstrom . |
| 2,173,489 | 9/1939 | Voigt . |
| 2,578,785 | 12/1951 | Davis . |
| 2,649,048 | 8/1953 | Pezzillo et al. . |
| 2,782,721 | 2/1957 | White . |
| 2,829,286 | 4/1958 | Britz . |
| 3,163,790 | 12/1964 | White . |
| 3,270,495 | 9/1966 | Connor ...................................... 60/602 |
| 3,557,549 | 1/1971 | Webster . |
| 3,572,982 | 3/1971 | Kozdon . |
| 4,445,337 | 5/1984 | McCreary ................................. 60/608 |
| 4,453,381 | 6/1984 | Dinger ..................................... 60/612 |
| 4,459,809 | 7/1984 | Tadokoro et al. ......................... 60/602 |
| 4,565,505 | 1/1986 | Woollenweber .......................... 417/407 |
| 4,641,977 | 2/1987 | Woollenweber . |
| 4,708,095 | 11/1987 | Luterek . |
| 4,708,602 | 11/1987 | McEachern, Jr. et al. ............. 417/407 |
| 4,776,168 | 10/1988 | Woollenweber .......................... 60/602 |
| 4,827,170 | 5/1989 | Kawamura et al. . |
| 4,850,193 | 7/1989 | Kawamura ............................... 60/608 |
| 4,878,347 | 11/1989 | Kawamura ............................... 60/608 |
| 4,882,905 | 11/1989 | Kawamura ............................... 60/608 |
| 4,885,911 | 12/1989 | Woollenweber et al. ................. 60/597 |
| 4,894,991 | 1/1990 | Kawamura ............................... 60/608 |
| 4,901,530 | 2/1990 | Kawamura ............................... 60/608 |
| 4,918,923 | 4/1990 | Woollenweber et al. ................. 60/614 |
| 4,935,656 | 6/1990 | Kawamura . |
| 4,955,199 | 9/1990 | Kawamura ............................... 60/608 |

(List continued on next page.)

FOREIGN PATENT DOCUMENTS

| | | |
|---|---|---|
| 295985 | 12/1988 | European Pat. Off. . |
| 367406 | 5/1990 | European Pat. Off. . |
| 2479899 | 10/1981 | France . |
| 57-212331 | 12/1982 | Japan . |
| 58-222919 | 12/1983 | Japan . |
| 59-49323 | 3/1984 | Japan . |
| 3202633 | 9/1991 | Japan . |
| 4-112921 | 4/1992 | Japan . |
| 5-5419 | 1/1993 | Japan . |
| 267149 | 8/1927 | United Kingdom . |
| 308585 | 11/1929 | United Kingdom . |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

Primary Examiner—Michael Koczo
Attorney, Agent, or Firm—Brinks Hofer Gilson & Lione

[57] ABSTRACT

An improved method and apparatus for increasing the charge air supply to an internal combustion engine throughout the engine operating range, and more particularly, at low engine speeds, and combines controlled two-stage compression of charge air with improved turbocharger operation to achieve a particularly flexible and effective supercharging system. Such supercharging systems are provided by a first charge air compressor driven by an electric motor, a second charge air compressor driven by an exhaust gas driven turbine, gas control means for the supercharging system and a control for the electric motor-driven compressor and gas control means. Preferably, the turbine-driven charge air compressor is also driven by a second electric motor operated by the control, and the gas control means comprises an exhaust gas diverter valve for the exhaust gas turbine inlet and pre-whirl vanes for the turbine-driven compressor inlet, both operated by the control.

22 Claims, 5 Drawing Sheets

U.S. PATENT DOCUMENTS

| | | | |
|---|---|---|---|
| 4,958,497 | 9/1990 | Kawamura | 60/608 |
| 4,958,708 | 9/1990 | Kawamura . | |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber | 417/107 |
| 5,121,605 | 6/1992 | Oda et al. | 60/608 |
| 5,176,509 | 1/1993 | Schmider et al. . | |
| 5,406,979 | 4/1995 | Kawamura | 60/608 |
| 5,560,208 | 10/1996 | Halimi et al. | 60/608 |
| 5,577,385 | 11/1996 | Kapich | 60/612 |
| 5,605,045 | 2/1997 | Halimi et al. | 60/607 |

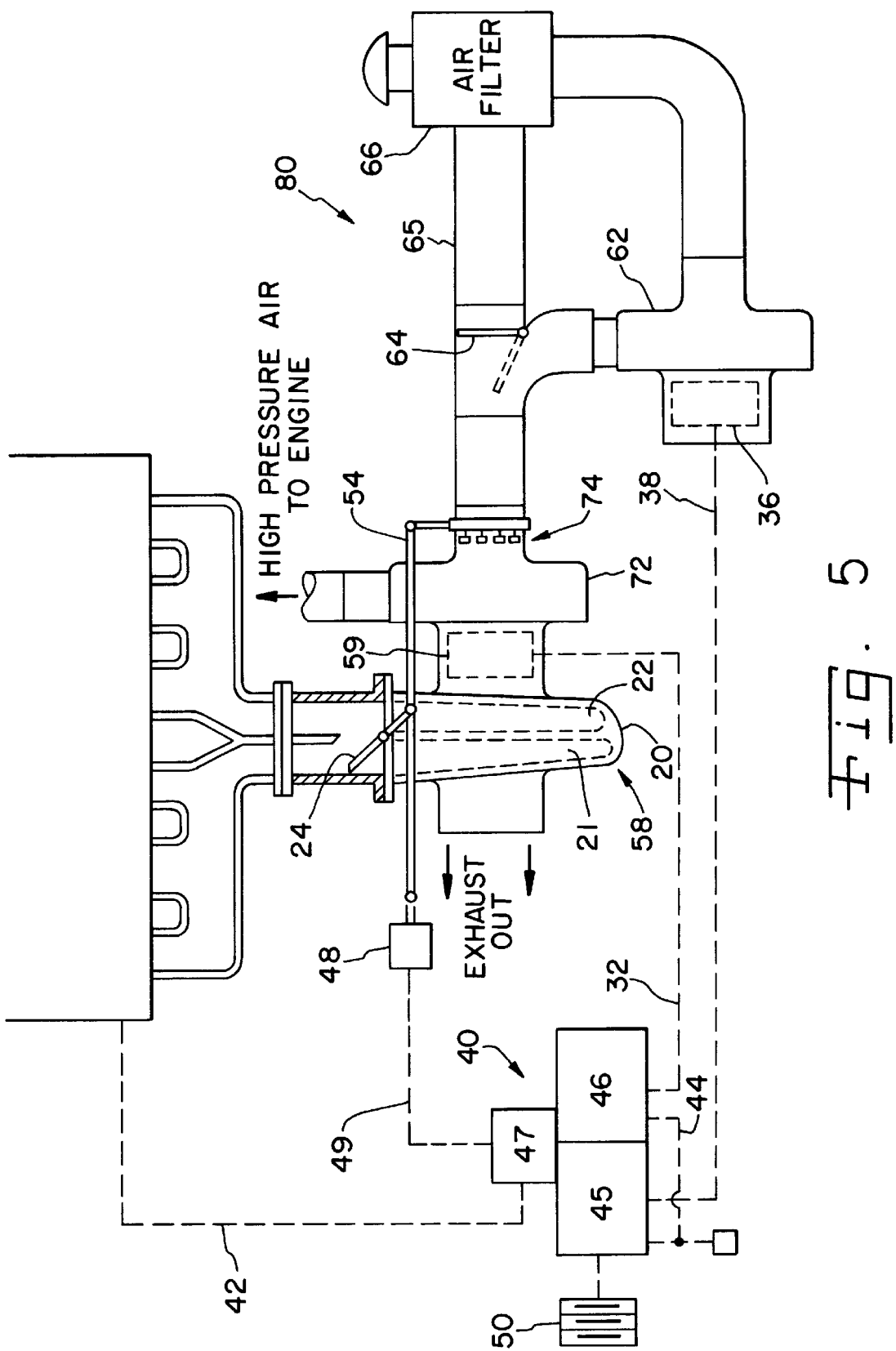

TWO-STAGE SUPERCHARGING SYSTEMS FOR INTERNAL COMBUSTION ENGINES

FIELD OF THE INVENTION

This invention relates generally to methods and apparatus for supplying air at above atmospheric pressure to the cylinders of an internal combustion engine and, more specifically, to improved methods and apparatus for two-stage compression of engine charge air for increasing the air supply above that which can be supplied by an unassisted turbocharger operating on exhaust gas energy alone.

BACKGROUND OF THE INVENTION

Fixed geometry turbochargers can be designed to operate efficiently at a particular engine load and speed. However, when operated over a broad range of engine speed and load, the compressor and turbine components are forced to function off their design points and, consequently, suffer losses in efficiency that affects engine performance adversely. If the turbocharger is matched to an engine at the engine's rated speed, it will run considerably off its maximum efficiency when the engine is "torqued down" to low engine operating speeds. Conversely, if the turbocharger is matched to an engine's low speed range, the turbocharger will have a tendency to "overspeed" when the engine is operated at maximum speed and load.

To prevent overspeeding in turbochargers that have been matched to the low engine speed range, a waste gate is frequently used to bypass exhaust gas around the turbine to limit turbine speed over the high engine speed range. The waste gate, however, allows the escape of exhaust gas energy, which could be better utilized by the turbocharger turbine, and results in a substantial loss in system efficiency.

A more efficient system generally known in the trade is one comprising variable geometry components in the turbocharger compressor, the turbocharger turbine, or both. The most common types are variable nozzle vanes ahead of the turbine wheel, and/or variable diffuser vanes in the compressor component.

Variable nozzle vanes ahead of the turbine wheel are connected together so that the throat area of each nozzle passage can be reduced over the low engine speed range and increased as the engine speed approaches its maximum, so that the turbocharger speed is kept within a safe operating range. The positioning of the vanes must be precisely controlled by engine speed and load, and they must be freely movable in the hot exhaust gas environment with minimal leakage through clearance spaces.

The various movable devices that have been employed in the turbocharger turbine have been complicated, expensive and subject to questionable durability. Consequently, they have met with limited commercial success.

A more practical approach to a variable device in the engine exhaust system was disclosed in U.S. Pat. No. 3,557,549 to Webster, assigned to Caterpillar Tractor Co., 1971. This system employs a diverter valve so positioned in a divided manifold system that it resides in a neutral position at high engine speed and load, but can be moved to a second position where it diverts all engine exhaust gas flow into one passage of a divided turbine casing at low engine speeds. This essentially doubles the flow of exhaust gas through the single turbine casing passage and maintains the turbocharger speed at higher levels than otherwise could be reached at low engine speeds. This device is much simpler than the complicated variable nozzle vane systems and does not require a precise control system for positioning.

The use of the diverter valve to divert exhaust gas allows the turbocharger to be matched efficiently to the higher engine speeds where the diverter valve is in a neutral position. When the engine is operated at low engine speeds, the diversion of full exhaust flow of the single turbine casing passage ahead of the turbine increases the turbocharger rotor speed to provide higher boost pressure to the engine cylinders, allowing the engine to produce more power and torque than otherwise could be obtained.

The increase in boost at low engine speeds produced by the diverter valve may be great enough to cause the turbocharger compressor to operate in its surge or unstable area. In this case, the compressor must be rematched to move its surge line to lower airflow so that the engine operating points fall within its stable operating regime. However, this causes a movement of the compressor efficiency islands and choke area to lower flow and can result in lowering the compressor efficiency when the engine is operating at high speed and load.

A variable geometry compressor that can shift the performance map of the compressor to a lower or higher flow range is one solution to the problem of keeping the compressor out of surge at low engine speeds and still maintain high efficiency at high engine speeds. Variable diffuser vanes comprise one type of variable geometry compressor that can be employed, but the movable vanes cause significant mechanical complication internally in the construction of the turbocharger and must be precisely positioned by a rather elaborate control system.

A more practical type of variable geometry device is to employ movable pre-whirl vanes upstream of the compressor wheel to provide positive and negative pre-whirl to the air entering the inducer of the compressor wheel. Negative pre-whirl moves the compressor operating range to higher flow and usually improves compressor efficiency. Positive pre-whirl moves the compressor operating range to lower flow and usually lowers compressor efficiency somewhat. However, since the maximum island of compressor efficiency is also moved to lower flow, the net effect of positive pre-whirl is to raise the level of efficiency available to the operating area of the engine.

It is thus advantageous to connect the movable diverter valve in the exhaust stream to the movable pre-whirl vanes in the airstream by a mechanical linkage, causing them to move in synchronization. With the diverter valve in neutral, the pre-whirl vanes are positioned to provide negative pre-whirl to the compressor, moving its flow range, so that the maximum efficiency is available in the high engine speed range. When the diverter valve is in the diverted position, for example, at low engine speeds, the pre-whirl vanes are moved to the positive pre-whirl position, thereby moving the maximum compressor efficiency to the low engine range. A simple, hydraulic cylinder or solenoid can be employed as an actuating means to move the mechanical linkage to either the high flow or low flow position by sensing the engine speed at which the transition is required to be made.

Both the diverter valve and the pre-whirl vanes are external from the turbocharger construction, resulting in much lower overall cost than other variable geometry devices that must be built into the internal construction of the turbocharger.

The movement of the compressor flow range by utilizing positive and negative pre-whirl is more fully described in a paper published in the *Proceedings of the Institute of Mechanical Engineers*, Vol. 18943/75, entitled "Experimental and Theoretical Performance of Radial Flow Turbocharger Compressor with Inlet Pre-Whirl", by Wallace, Whitfield and Atkey. It is also described in U.S. Pat. No. 5,025,629 to Woollenweber, June 1991.

A combination of a diverter valve in the engine exhaust system, pre-whirl vanes in the compressor wheel inlet and a motor-assisted turbocharger, is disclosed in U.S. Pat. No. 5,560,208. The diverter valve channels all exhaust gases from the engine cylinders into one channel of a divided turbine casing at idle and over the low engine speed range, thereby increasing the turbocharger speed in order to provide a higher level of boost to the engine cylinders during acceleration. The addition of a motor-assist to the turbocharger augments the boost pressure increase caused by the exhaust gas diversion. This augmented air supply during engine acceleration can lower noxious emissions and smoke formation. In addition, an increase in low engine speed torque is made possible by the augmented air supply which contributes to faster vehicle response to an increase in applied load.

BRIEF SUMMARY OF THE INVENTION

This invention provides an improved method and apparatus for increasing the charge air supply to an internal combustion engine throughout the engine operating range, and more particularly, at lower engine speeds, and combines controlled two-stage compression of charge air with improved turbocharger operation to achieve a particularly flexible and effective supercharging system.

In the invention, a supercharging system is provided by a first charge air compressor driven by an electric motor, a second charge air compressor driven by an exhaust gas driven turbine, gas control means for the supercharging system and a control for the electric motor-driven compressor and gas control means. Preferably, the turbine-driven charge air compressor is also driven by a second electric motor operated by the control, and the gas control means comprises an exhaust gas diverter valve for the exhaust gas turbine inlet and pre-whirl vanes for the turbine-driven compressor inlet, both operated by the control, and a check valve-controlled air inlet bypass for the turbine-driven compressor inlet.

In accordance with this invention, an additional increase in boost pressure at engine idle and over the low engine speed range can be accomplished by operating the diverter valve and the motor-driven compressor in series with the turbine-driven compressor for two-stage charge air compression to enhance the operation of an internal combustion engine.

Diverter valve operation permits more effective use of the exhaust gas energy by the turbine-driven compressor. In preferred systems, by energizing an electric motor assisting the turbine driving the first compressor simultaneously with the motor driving the motor-driven compressor, the engine can be provided with a two-stage air charging system to further augment the boost pressure provided to the engine cylinders at idle and over the low engine speed range. With systems of the invention the engine cylinders can be efficiently supplied with a maximal amount of air for the purpose of cleaning up the combustion and for increasing low engine speed torque.

A preferred method of operation for a preferred supercharging system of the present invention is to energize both motors at engine idle speed at a minimum boost pressure level to put a significant level of charge air pressure into the intake manifold in preparation for an engine acceleration and to position the diverter valve in its exhaust gas diverted position at all engine speeds below a predetermined value, for instance, below that speed corresponding to the torque peak. Also, by super-energizing both compressor-driving motors for a short period of time when the throttle is opened to accelerate the engine, a compounded boost pressure is available to the engine and the diverted exhaust gas energy allows the turbocharger to augment this compounded boost pressure to a maximal level during the acceleration period.

The motor-driven compressor can be de-energized after a limited time interval, whereas the motor assisting the turbine during the second compressor can be allowed to run longer than the motor-driven compressor, for instance up to the torque peak speed of the engine. At the torque peak engine speed, the diverter valve can be returned to the neutral position and both motors can be de-energized, as there is normally sufficient energy available in the engine exhaust to allow the turbine-driven compressor to provide the engine with sufficient air for smoke-free combustion.

BRIEF DESCRIPTION OF THE DRAWINGS

FIG. 5 is a schematic view of a two-stage supercharging system of the invention comprising an exhaust gas diverter valve, compressor pre-whirl vanes, a motor-driven compressor in series with a motor-assisted turbocharger compressor, and a check valve in a bypass air inlet line to the turbocharger compressor.

DESCRIPTION OF THE PREFERRED EMBODIMENTS

Supercharging systems of the invention, shown in FIGS. 1–5 provide maximal levels of charge air pressure at low idle speed and over the low engine speed range up to the torque peak speed of the engine, thereby allowing the engine to produce much higher torque, and at the same time, reduce noxious emissions in the exhaust gas. In the illustrated embodiments of this invention, a turbocharger, preferably motor-assisted, with its compressor in series with a motor-driven compressor provide a two-stage charge air system for an internal combustion engine, permitting maximal levels of charge air pressure to be effectively achieved from a compressor pressure ratio that is the product of each compressor's pressure ratio; and the engine exhaust gas driving the turbocharger is controlled for more effective use of the available exhaust gas energy by a diverter valve upstream of the turbocharger turbine. Through control of the diverter valve, the exhaust gas flow from all engine cylinders can be concentrated in one volute of a divided volute turbine casing when the engine speed falls below torque peak speed so as to augment the rotational speed of the turbocharger, resulting in higher boost pressure in the intake manifold. In addition, pre-whirl vanes can be provided at the inlet of turbocharger compressor and controlled to permit effective operation of the turbocharger compressor in the two-stage charge air systems of the invention. Systems of the invention permit flexibility in controlling the charge air boost to internal combustion engines as described further below.

Having controllable maximal boost pressures available over the entire range of operation of an internal combustion engine, and particularly, at engine idle speed, allows more fuel to be injected into the engine cylinders sooner during acceleration and reduces smoke and emissions during the transient period, and the engine is able to produce more output torque during acceleration and periods of high loading. The higher boost pressures during acceleration can eliminate the need for fuel limiting devices, such as an aneroid control or fuel pump rack limiters.

Figure 1:
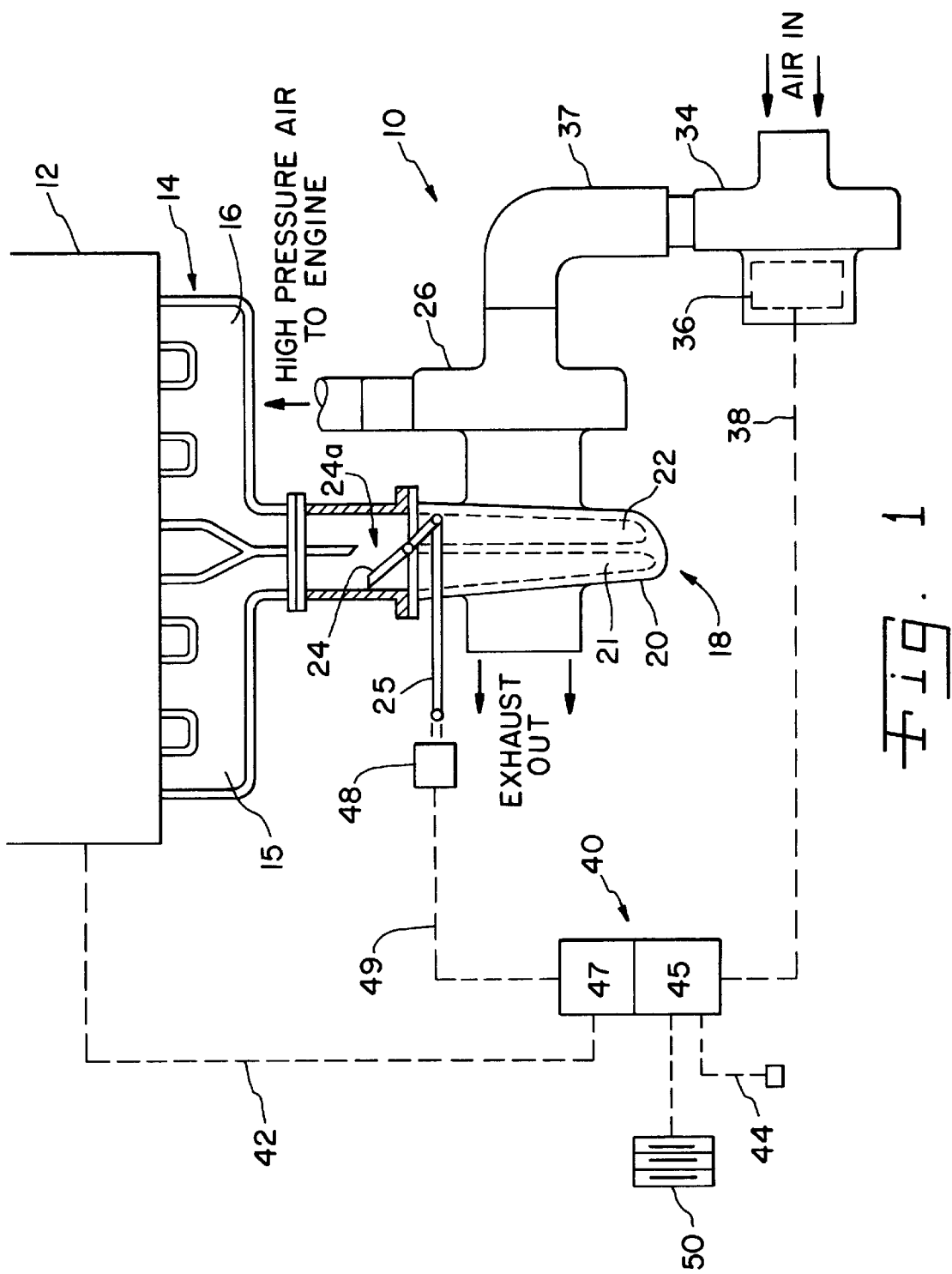
FIG. 1 is a schematic view of a two-stage supercharging system of the invention comprising an exhaust gas diverter valve and a motor-driven compressor in series with a turbocharger compressor.

One supercharging system of this invention is generally indicated at 10 in FIG. 1. Internal combustion engine 12 has an exhaust system 14 with two exhaust manifolds 15 and 16, each from one bank of engine cylinders. Turbocharger 18 has a divided turbine inlet casing 20 with two volute passageways 21 and 22 into the exhaust gas turbine. Diverter valve 24 controls whether engine exhaust gas from exhaust manifolds 15 and 16 is delivered to both volutes 21 and 22, or to only volute 22, as shown in FIGS. 1–5. When exhaust gas volume is low, all of the exhaust gas flow can be concentrated in volute 22, as shown in FIG. 1, to provide a higher exhaust gas pressure at the turbine inlet and deliver more power to the exhaust gas turbine of turbocharger 18. The turbocharger turbine uses the energy of the engine exhaust gas to rotate a turbocharger compressor 26 and deliver charge air at increased pressure to the cylinders of the internal combustion engine 12.

The system 10 further includes a second charge air compressor 34 whose output is connected through conduit means 37 with the input of the turbocharger compressor 26. The turbocharger compressor 26 and second compressor 34 can thus provide two-stage compression of the charge air input to internal combustion engine 12 at a pressure ratio that is the product of the pressure ratio of the turbocharger compressor and the pressure ratio of the second compressor 34. The second compressor 34 is preferably driven by an electric motor 36 that can be controlled over an electrical connection 38.

Operation of the two-stage supercharging system of FIG. 1 can be effected by a suitable electronic control 40, which can be connected with an engine speed signal over connection 42 and an engine throttle signal over connection 44. Control 40 can have many forms, but is preferably a plurality of electric controllers such as relays that can be independently controlled, as described below, to provide a controllable flow of charge air at maximal pressures, when needed, under the variable operating conditions of the internal combustion engine and throughout its operating range of speeds and loads. A relay comprising controller 45 can be connected with the engine electrical system 50 to connect a lower and a higher voltage to the electric motor 36, permitting selective super-energizing of the electrical motor and compressor 34.

In a preferred method of operation, when the engine 12 is started and running at low idle, the motor 36 in the motor-driven compressor 34 is energized over connection 38 by controller 45 to bring the compressor up to a minimum speed level in order to supply the engine cylinders with a significant level of charge air pressure in preparation for an acceleration of the engine. Power for the motor 36 is taken from the engine electrical system 50. The diverter valve 24 is always in its diverted position at engine speeds below a predetermined intermediate engine speed. On-off control 47 responds to an engine speed signal 42 to energize a solenoid 48 over connection 49 to move the diverter valve 24 to its neutral position at speeds above the predetermined engine speed, closing opening 24a so the exhaust gas flows into both volutes 21 and 22. The diverter valve could also be moved by a hydraulic cylinder actuated by fluid pressure when the engine speed is above or below the predetermined intermediate level.

When the throttle is opened to accelerate the engine, a throttle signal 44 can activate a super-energizing circuit in the controller 45 that allows increased voltage to be applied to the motor 36 to impart increased torque to the compressor shaft. The motor 36 is preferably de-energized when the turbocharger reaches in intermediate speed level at which there is sufficient energy in the exhaust gas to drive the turbocharger 18 to high rotative speed. When the engine reaches torque peak speed, the engine speed signal 42 to the diverter valve control 47 can de-energize the solenoid 48 and allow the diverter valve 24 to return to the neutral position where the exhaust gas flow is channeled into both volutes of the turbocharger turbine casing 20.

When the engine speed falls to a level below torque peak, the diverter valve 24 can again be moved to the diverted position shown in FIG. 1. Whenever the turbocharger speed falls to the predetermined minimum speed, motor 36 can be energized to maintain the minimum boost pressure level in preparation for the next acceleration of the engine.

The diverter valve 24 can be actuated by other means than an electric solenoid; for example, by a hydraulic cylinder that is operated by engine lube oil. In this case, the engine speed sensor signal 42 can be sent to a solenoid that opens and closes a valve in a lube oil pressure line from the engine. A spring in the hydraulic cylinder can, through the linkage 25, hold the diverter valve 24 in the diverted position until the pressure of the oil admitted to the cylinder can overcome the spring pressure and move the diverter valve to the neutral position when the engine speed exceeds the torque peak speed. Other modes of the control of the diverter valve are possible.

Figure 2:
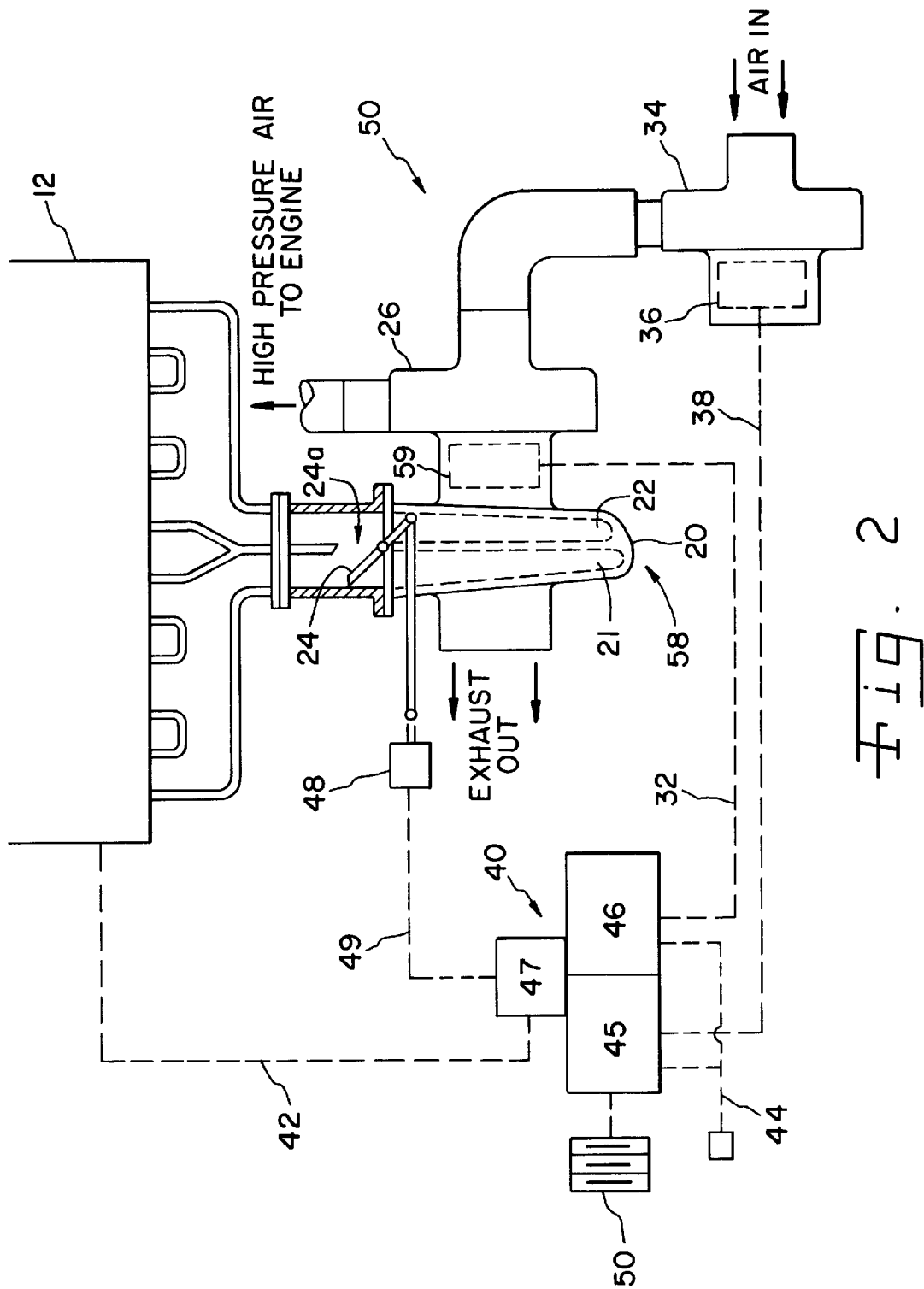
FIG. 2 is a schematic view of another two-stage supercharging system of the invention comprising an exhaust gas diverter valve and a motor-driven compressor in series with a motor-assisted turbocharger compressor.

Another supercharging system 50 of the invention is illustrated in FIG. 2. The supercharging system of FIG. 2 is like that shown in FIG. 1, except that system 50 includes a turbocharger 58 that is equipped with an electric motor 59, and an additional electric control 46. The motor 59 is mounted to assist the turbocharger turbine in rotating the turbocharger compressor 26. The motor 59 is preferably an electric motor, with its rotor attached to the shaft interconnecting the turbocharger turbine and compressor and its stator carried by the turbocharger housing, as described and illustrated, for example, in U.S. Pat. No. 5,906,098. Turbocharger motor 59 can be controlled over electrical connection 32 to provide additional charge air boost when the engine exhaust gas energy is low.

In a preferred method of operation, when the engine 12 is started and running at low idle, the motor 36 in the motor-driven compressor 34, and the motor 59 in the motor-assisted turbocharger 58 are energized over connections 38 and 32 by controllers 45 and 46 to bring both compressors up to a minimum speed level in order to supply the engine cylinders with a significant level of charge air pressure in preparation for an acceleration of the engine. Power for the motors is taken from the engine electrical system 50. The diverter valve 24 is always in its diverted position, as shown in FIG. 2, at engine speeds below torque peak speed. On-off control 47 responds to an engine speed signal 42 to energize a solenoid 48 over connection 49 to move the diverter valve 24 to its neutral position at speeds above torque peak speed, closing opening 24a, so that exhaust gas flows into both volutes 21 and 22.

When the throttle is opened to accelerate the engine, a throttle signal over connection 44 can activate super-energizing circuits in controllers 45 and 46 that allows increased voltage to be applied to motors 36 and 59 to impart increased torque to both compressor shafts. Both motors 36, 59 are preferably de-energized when the turbocharger reaches an intermediate speed level at which there is sufficient exhaust gas energy to drive the turbocharger 58 to high rotative speed. When the engine reaches torque peak speed, the engine speed signal 42 to the diverter valve controller 47 can de-energize the solenoid 48 and allow the diverter valve 24 to return to the neutral position where exhaust gas is channeled into both volutes of the turbocharger turbine casing 20.

When the engine speed falls to a level below torque peak, the diverter valve 24 can again be moved to the diverted position shown in FIG. 2. Whenever the turbocharger speed falls to the predetermined minimum level, one or both motors 36 and 59 can be energized to maintain a minimum boost level to the engine in preparation for the next acceleration.

Figure 3:
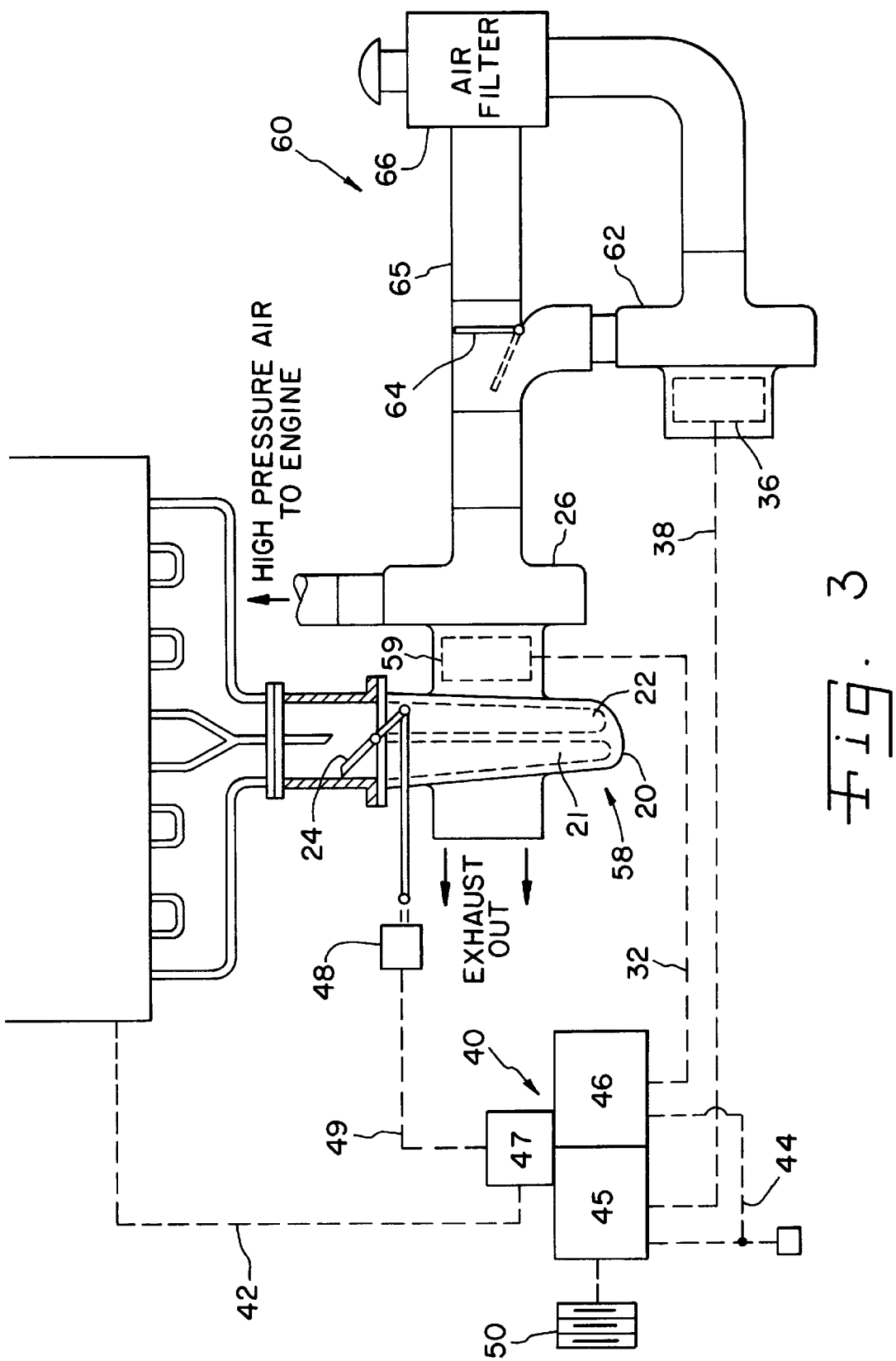
FIG. 3 is a schematic view of a two-stage supercharging system of the invention comprising an exhaust gas diverter valve, a motor-driven compressor in series with a motor-assisted turbocharger compressor, and a check valve in a bypass air inlet line to the turbocharger compressor.

In the supercharging system 60 of the invention shown in FIG. 3, a motor-driven compressor 62 having a thru-flow capacity matched to the low speed range of the engine is used. In this case, the motor-driven compressor 62 might present a significant restriction to airflow into compressor 26. To avoid a restriction to airflow, which may be significant where the engine is operating at high speed and load, a combination check/bypass valve 64 can be employed in a bypass air inlet line 65 as shown in FIG. 3.

The operation of this supercharging system 60 is the same as that described for FIG. 2 except that, when the engine is accelerated from low idle, the air pressure generated by the motor-driven compressor 62 is sufficient to hold the check valve 64 closed so that the compressed air is forced to enter the turbocharger compressor 26. When the turbocharger 58 reaches a speed where the motor-driven compressor 62 can be a restriction to airflow, the check valve 64 will open to allow the turbocharger compressor 26 to draw air through the bypass air inlet 65 directly from the air filter 66.

The very large augmentation of charge air pressure made possible by this invention may easily be large enough to force a normally matched turbocharger compressor to run into its unstable operation area. If the turbocharger compressor is re-matched to the engine by moving the surge line of the compressor to lower airflow values, this corrective measure will also lower the maximum flow of the compressor and reduce the compressor efficiency at high engine speed and load.

Figure 4:
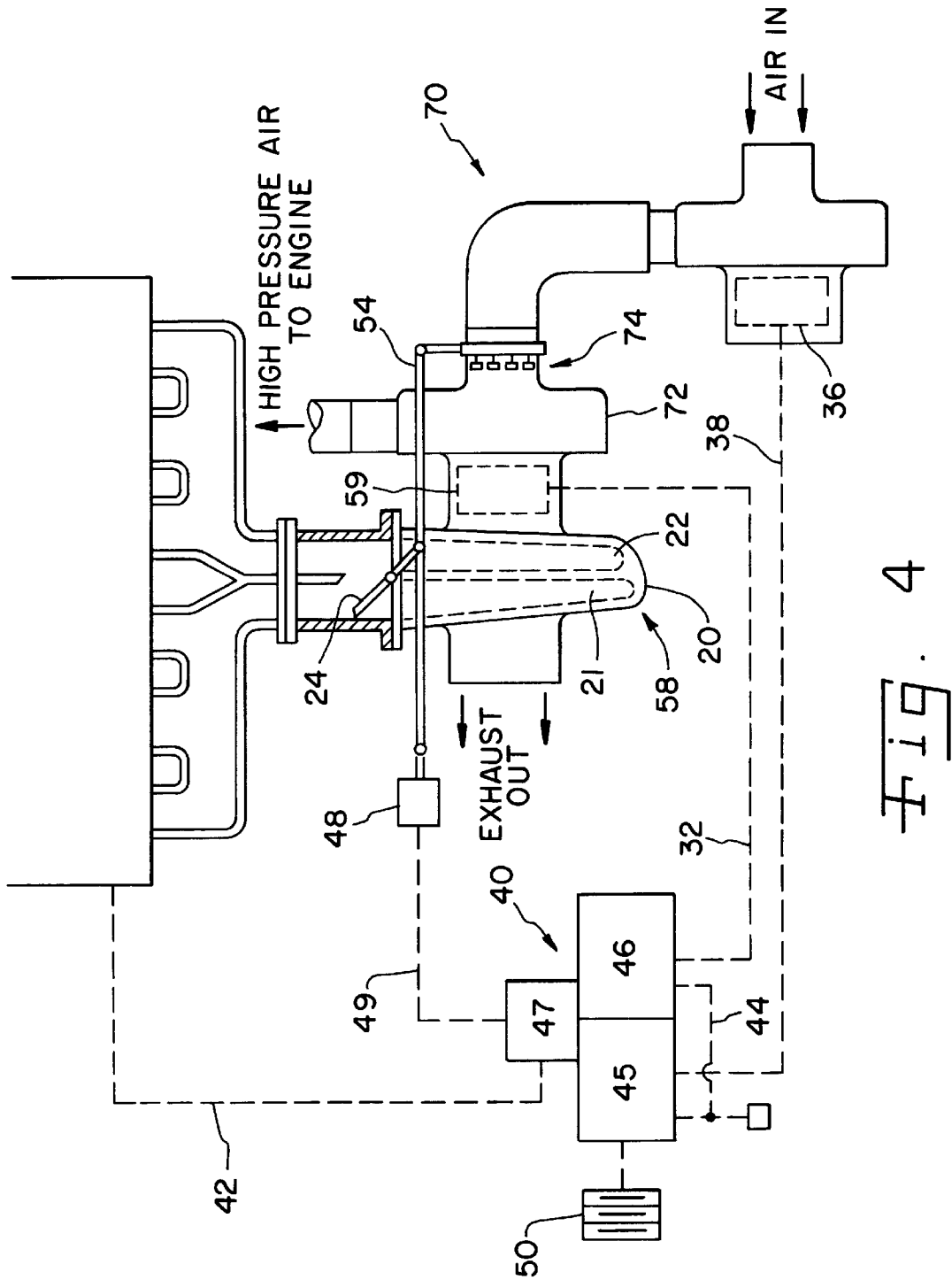
FIG. 4 is a schematic view of a two-stage supercharging system of the invention comprising an exhaust gas diverter valve, compressor pre-whirl vanes, and a motor-driven compressor in series with a motor-assisted turbocharger compressor.

The supercharging system 70 of FIG. 4 addresses this problem. Compressor surge from the high boost pressures provided to the engine by this invention can be avoided by equipping the turbocharger compressor 72 with movable pre-whirl vanes 74 placed in the compressor inlet duct, as illustrated in FIG. 4. With the exception of the additional pre-whirl vanes 74 (and the associated mountings and actuating mechanism) in the turbocharger compressor 72, and the extended linkage 54 from solenoid 48 to both valve 24 and the pre-whirl vane actuators, the elements of FIG. 4 are substantially like those of FIG. 2.

In the system of FIG. 4, the pre-whirl vanes 74 are held in a high flow negative pre-whirl position when the diverter valve 24 is in neutral, i.e., when exhaust gas is delivered to both volutes 21 and 22. The diverter and pre-whirl vane linkage 54 is connected to and moves simultaneously diverter valve 24 and the pre-whirl vanes 74. When the exhaust gas is diverted to volute 22 at speeds below torque peak speed, as shown in FIG. 4, the pre-whirl vanes 74 are moved to the positive pre-whirl position. This moves the compressor surge line of turbocharger compressor 72 to lower airflow values and allows higher boost pressure to be supplied to the engine without incurring surge of the turbocharger compressor 72. The use of a diverter valve connected to compressor pre-whirl vanes is more completely described in U.S. Pat. No. 5,025,629, issued Jun. 25, 1991, to William E. Woollenweber.

The supercharging system 80 shown in FIG. 5 is identical with that shown in FIG. 4, except that the combination check/by-pass valve 64 is added in a bypass air inlet line 65 upstream of the turbocharger compressor 72.

While the preferred supercharging systems 60, 70 and 80 of FIGS. 3, 4 and 5 all include a motor-assisted turbocharger 58 and a controller 46 for electric motor 59, substitution of a non-motor-assisted turbocharger (like turbocharger 18 of FIG. 1) for the motor-assisted turbocharger 58 can be made in such systems within the scope of the invention.

While the invention has been described in its presently contemplated best modes, the invention is susceptible to numerous modifications, modes and embodiments within the ability of those skilled in the art. Accordingly, the scope of the invention is defined by the following claims.

What is claimed is:

1. A variable geometry two-stage supercharging system for an internal combustion engine, comprising a first stage compressor driven by a first electric motor;
   a turbine-driven by engine exhaust gas;
   a second stage compressor driven by said turbine and by a second electric motor;
   an air inlet for said second stage compressor bypassing said first stage compressor and including a check valve closing said air inlet during operation of said first stage compressor;
   air inlet control vanes on the air inlet of the second stage compressor for providing compressor inlet pre-whirl, said vanes being variable to control the amount of pre-whirl;
   an exhaust gas control valve for controlling the flow of engine exhaust gas to said turbine; and
   control means for controlling said vanes, exhaust gas control valve and said first and second electric motors.

2. The supercharging system of claim 1, wherein said exhaust gas control valve and said air inlet control vanes are operated simultaneously.

3. The supercharging system of claim 1 wherein said exhaust gas control valve and air inlet control vanes are controlled independent of said electric motors.

4. The supercharging system of claim 1, wherein said turbine and said second stage compressor comprise a turbocharger.

5. The supercharging system of claim 4, wherein said turbine includes a dual volute inlet and said exhaust gas control valve, when actuated, directs substantially all exhaust gas into one of said volutes to enhance turbine performance.

6. The supercharging system of claim 4, wherein said second electric motor is included in said turbocharger with its rotor at a location between said second stage compressor and said turbine.

7. The supercharging system of claim 1 wherein said control comprises an on-off controller operated by an engine speed signal to control movement of an actuator controlling both the exhaust gas control valve and air inlet control vanes, and at least one on-off controller operated by an engine accelerator signal to control at least one of first and second electric motors.

8. A two-stage engine supercharging system, comprising
a turbocharger having a gas turbine with a gas inlet for connection to receive a flow of gas, and a turbine wheel driven by said flow of gas and connected to drive a rotatable shaft, and having further a compressor with a gas inlet and a compressor wheel driven by said rotatable shaft to compress gas entering said gas inlet;
a first electric motor in said turbocharger connected to rotate said rotatable shaft and compressor wheel;
a second compressor driven by a second electric motor, said second compressor being connected in series with said turbocharger compressor, said compressors providing two-stage gas compression for an engine intake;
a gas control means comprising a valve to concentrate the exhaust gas into said turbocharger gas turbine, and
motor and gas control means operable for enhanced engine operation,
said exhaust gas concentrating valve and said first and second electric motors being operated at engine idle speeds, said first and second motors being super-energized upon activation of the engine accelerator.

9. The supercharging system of claim 8 wherein the gas control means further comprises an inlet gas control for the gas inlet of the turbine-driven compressor.

10. The supercharging system of claim 8 wherein said gas control means further comprises an air inlet check valve in an air inlet to said turbine-driven compressor that bypasses said second compressor.

11. A two-stage engine supercharging system, comprising
a turbocharger having a gas turbine with a gas inlet for connection to receive a flow of gas, and a turbine wheel driven by said flow of gas and connected to drive a rotatable shaft, and having further a compressor with a gas inlet and a compressor wheel driven by said rotatable shaft to compress gas entering said gas inlet;
a first electric motor in said turbocharger connected to rotate said rotatable shaft and compressor wheel;
a second compressor driven by a second electric motor, said second compressor being connected in series with said turbocharger compressor, said compressors providing two-stage gas compression for an engine intake;
a gas control means comprising a gas control valve for the gas inlet of the turbine and an inlet gas control for the gas inlet of the turbocharger compressor; and
motor and gas control means operable for enhanced engine operation,
wherein said inlet gas control for the gas inlet of the compressor and said gas control valve are operated simultaneously at the predetermined engine speed.

12. A two-stage engine supercharging system, comprising
a turbocharger having a gas turbine with a gas inlet for connection to receive a flow of gas, and a turbine wheel driven by said flow of gas and connected to drive a rotatable shaft, and having further a compressor with a gas inlet and a compressor wheel driven by said rotatable shaft to compress gas entering said gas inlet;
a first electric motor in said turbocharger connected to rotate said rotatable shaft and compressor wheel;
a second compressor driven by a second electric motor, said second compressor being connected in series with said turbocharger compressor, said compressors providing two-stage gas compression for an engine intake;
a gas control means; and
motor and gas control means operable for enhanced engine operation,
wherein said gas control means further includes an air inlet check valve in the air inlet to the turbocharger compressor that bypasses said second compressor, a gas control valve for the gas inlet of the turbine, and an inlet gas control for the gas inlet of the turbine-driven compressor that are operated simultaneously at a predetermined engine speed.

13. A method of operating an internal combustion engine comprising
controlling a source of electrical energy in providing a first stage of compression of charge air for the internal combustion engine,
further compressing the compressed charge air from the first stage of compression by using the exhaust gas of the internal combustion engine to provide a second stage of compression of the charge air;
controlling the exhaust gas by concentrating its flow below a predetermined engine speed to improve the utilization of the exhaust gas energy in the further compression of the charge air.

14. The method of claim 13 including the step of further compressing the charge air from the first stage of compression by controlling the source of electrical energy to assist the exhaust gas in providing the second stage of charge air compression.

15. The method of claim 14 wherein the electrical energy is controlled to provide a first stage of charge air compression and to assist the exhaust gas in providing the second stage of charge air compression only below a predetermined engine speed.

16. The method of claim 14 wherein the source of electrical energy is controlled to increase the first stage and second stage compression of charge air at low engine speeds upon a demand for engine acceleration.

17. The method of claim 13 further comprising the step of controlling the charge air in the second stage of compression to avoid instability due to the first stage of compression.

18. A method of operating an internal combustion engine comprising
controlling a source of electrical energy in providing a first stage of compression of charge air for the internal combustion engine;
further compressing the compressed charge air from the first stage of compression by using the exhaust gas of the internal combustion engine to provide a second stage of compression of the charge air; and
controlling the exhaust gas by concentrating its flow below a predetermined engine speed to improve the utilization of the exhaust gas energy in the further compression of charge air, the source of electrical energy being controlled to provide a first stage of charge air compression only below a predetermined engine speed, and the exhaust gas being concentrated only below a predetermined engine speed.

19. A method of operating an internal combustion engine comprising controlling a source of electrical energy in providing a first stage of compression of charge air for the internal combustion engine;

further compressing the compressed charge air from the first stage of compression by using the exhaust gas of the internal combustion engine to provide a second stage of compression of the charge air, and by controlling the source of electrical energy to assist the exhaust gas in providing the second stage of charge air compression; and controlling the exhaust gas by concentrating its flow below a predetermined engine speed to improve the utilization of the exhaust gas energy in the further compression of charge air, the source of electrical energy being controlled to increase the first stage and second stage compression of charge air at low engine speeds upon a demand for engine acceleration, the increase in the first and second stage air compression being terminated at an engine speed intermediate the low engine speed and engine torque peak speed.

20. A two-stage supercharging system for an internal combustion engine having a charge air inlet and an exhaust gas outlet, comprising a charge air compressor driven by a first electric motor;

a turbocharger having an exhaust gas turbine with a dual volute exhaust gas input, a compressor driven by the exhaust gas turbine and an assisting second electric motor;

a charge air conduit connecting said turbocharger compressor and charge air compressor in series with the charge air inlet of the internal combustion engine;

an exhaust gas conduit including a diverter valve operable to concentrate exhaust gas from the exhaust gas outlet of the internal combustion engine into one of the volutes of the dual volute exhaust gas input of the turbocharger exhaust gas turbine; and a control for operation of the diverter valve and the first and second electric motors at idle speed and up to about torque peak speed of the internal combustion engine and for ceasing operation of the diverter valve and first and second electric motors above about engine torque peak speed.

21. The supercharging system of claim 20 further including pre-whirl vanes in said turbocharger compressor, and wherein said control includes a vane control connected to control said vanes, said control coordinating operation of said electric motors said diverter valve and said vanes.

22. The supercharging system of claim 20 further comprising air inlet for said turbocharger compressor bypassing said charge air compressor, said air inlet including a check valve for closing said air inlet during operation of said charge air compressor.

* * * * *

UNITED STATES PATENT AND TRADEMARK OFFICE
CERTIFICATE OF CORRECTION

PATENT NO. : 6,079,211
DATED : June 27, 2000
INVENTOR(S) : William E. Woollenweber and Edward M. Halimi It is certified that error appears in the above-identified patent and that said Letters Patent is hereby corrected as shown below:

Item [56], References Cited,
Under U.S. Patent Documents, please insert -- 3,961,199, 6/1976, Bronicki -- between "3,572,982, 3/1971, Kozdon" and "4,445,337, 5/1984 Mc Creary."

Signed and Sealed this

Eighteenth Day of September, 2001

Attest:

NICHOLAS P. GODICI
Attesting Officer   Acting Director of the United States Patent and Trademark Office